Nov. 3, 1959    H. KARLSSON    2,911,198
PELLET TYPE HEAT EXCHANGER
Filed Sept. 28, 1956

INVENTOR
Hilmer Karlsson
By
Wayne H. Lang
AGENT

United States Patent Office 2,911,198
Patented Nov. 3, 1959

2,911,198
PELLET TYPE HEAT EXCHANGER

Hilmer Karlsson, Wellsville, N.Y., assignor to The Air Preheater Corporation, New York, N.Y., a corporation of New York Application September 28, 1956, Serial No. 612,643

3 Claims. (Cl. 257—55)

The present invention relates generally to heat exchangers or chemical reactors of the pellet type and more specifically to apparatus effective in simultaneously placing in heat exchange relationship a moving bed of solid materials and a plurality of independent fluids.

It has heretofore been proposed that gaseous fluid and a mass of finely divided particles or pellets be placed in heat exchange relationship by passing a fluid upwardly through a contacting vessel containing a descending stream of pellets. Arrangements for distributing and retarding the flow of pellets through a contacting vessel have been suggested whereby a series of horizontal bars are placed transverse to the descending pellets and the normal flow of fluid therethrough. In various applications of this general type operational temperatures are limited chiefly by the characteristics of the material used for the transverse rods, and in view thereof an important object of this invention is to provide an arrangement whereby cooling means introduced to the transverse rods permits operational temperatures well above the usual limits.

Another object of this invention is to provide an arrangement whereby pellet distribution and retarding bars of the type defined are utilized to provide ducts through which a first fluid may pass in simultaneous heat exchange relation with a second fluid and the descending pellets.

It is a further object of this invention to provide a combined pellet and tubular heat exchanger wherein pellets simultaneously serve the dual function of heat transfer medium and cleaning agent.

These and other objects of my invention will become more apparent when read in conjunction with the accompanying drawings in which.

Figure 1:
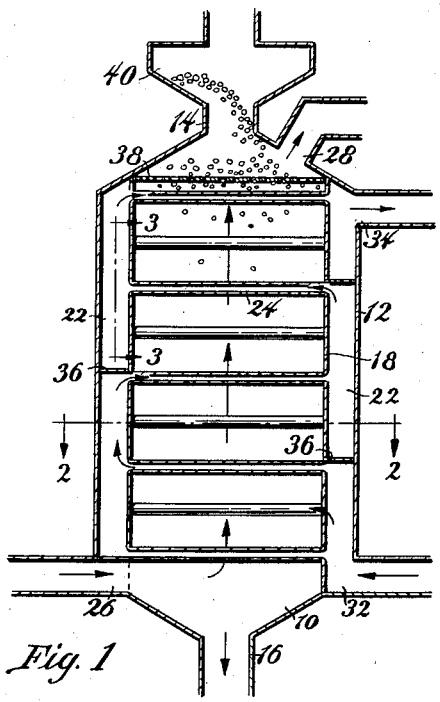
Figure 1 is a diagrammatic sectional elevation of a contacting chamber for a pellet type heat exchanger or chemical reactor of the type herein defined.

Referring particularly to Figure 1 of the drawings, the pellet chamber 10 comprises an upright elongate shell or housing 12 closed at its upper and lower ends and having a pellet inlet duct 14 for the admission of pellets from a hopper 40 to the upper portion of the chamber and an outlet duct 16 adapted to withdraw the pellets from the bottom of the chamber. A pair of tube-sheets 18 bonded to the inner walls of the chamber 10 in spaced relation provide a pair of header sections 22 interconnected by a series of tubular members 24. An inlet 26 in the lower portion of the housing 12 admits hot gas to the lower portion of the chamber 10 where it flows upward over the tubular members 24 and in contact with the falling pellets to an outlet 28 where it is exhausted from the chamber. In addition to the ports leading into chamber 10, header sections 22 are provided with a cold air inlet 32 and a heated air outlet 34 at opposite ends thereof to permit the circulation of a fluid through the tubes and their adjoining headers.

The individual header sections 22 are divided by a series of transverse baffles 36 into a plurality of subjacent chambers, opposite ones of which are linked by the tubular members 24. Opposite baffles 36 are staggered in order that fluid entering inlet 32 is forced to flow serially through the interconnected banks of tubular members 24 to the spaced outlet 34 in continuous heat exchange relation with the hot gas flowing through chamber 10.

A pellet distributing means 38 comprising a mesh, grating or a series of spaced elongate members is arranged to distribute the pellets while simultaneously retarding their descent from pellet reservoir 40.

Figure 3:
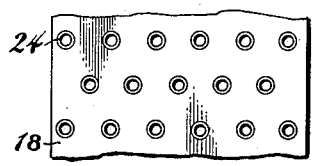
Figure 3 is a section of line 3—3 of Figure 1.
Figure 2:
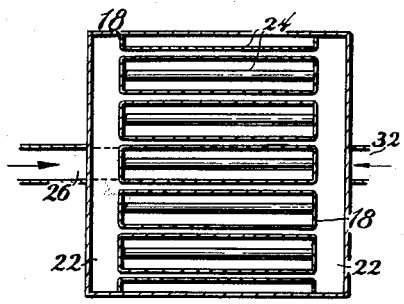
Figure 2 is a section on line 2—2 of Figure 1.

Referring more particularly to Figure 3 of the drawing, a longitudinal section of the pellet contacting chamber is arranged to show a series of cylindrical tubes arranged in staggered relation in parallel rows so that tubes in alternate rows lie in vertical alignment to present a tortuous path for the movement of pellets and gases through the interstices therebetween. By such device the gravitating pellets and the contra-flowing gases are simultaneously retarded and mixed so as to provide a high rate of heat transfer therebetween.

Figure 4:
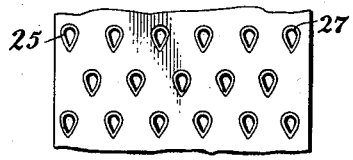
Figure 4 is a view similar to Figure 3 of a modified form of the invention.

In Figure 4 a modified form shows a series of streamline tubes 25 arranged similar to those of Figure 3 to provide for the passage of fluid therethrough in heat exchange relation with a fluid flowing thereover. The streamline tubes are disposed horizontally with the broad edge 27 thereof presented upward to afford a greater surface area to the descending pellets. By this arrangement resistance to the descending pellets is increased substantially while the resistance to fluid flowing upward thereover remains substantially unchanged.

In operation the pellet reservoir 40 is provided with a continuous supply of pellets from a non-illustrated source of supply while the outlet 16 is arranged to direct the pellets to a predetermined destination where they are to be further processed. Hot gases from inlet 26 are directed upward over the transverse tubular members 24 in simultaneous heat exchange relation with the pellets gravitating from inlet 40 and the cool fluid circulating serially through tubes 24 from inlet 32 to outlet 34.

Fluid circulating from inlet 32 through tubes 24 to outlet 34 may be utilized solely because of its cooling effect upon the tubes 24 and tube sheets 18. However, the degree of heat rise in this fluid may predicate its further use in the heating cycle of which it may be a part. Accordingly, by this arrangement the temperature of gases supplied through inlet 26 may be increased far beyond that feasible in a conventional heat exchanger and under normal circumstances; furthermore, the fluid being circulated from inlet 32 to outlet 34 may absorb sufficient heat to warrant its subsequent use in the system to further improve the thermal efficiency thereof.

While traversing the chamber 10 from inlet 14 to outlet 16 the pellets provide an abrasive effect upon any deposits that collect upon the tubes 24 in a manner that effectively removes the deposits while simultaneously permitting the pellets to serve as a heat transfer medium. By maintaining the heat transfer surfaces free from deposits of foreign particles the efficiency of the heat transfer through the tubes 24 to the cooling fluid therein is not permitted to degenerate with use.

While this invention has been described with reference to the rectangular housing illustrated in the drawing, it is evident that a cylindrical housing may be used or that other minor changes may be made without departing from the spirit of the invention, and it is intended that all matter contained in this description or shown in the accompanying drawings shall be interpreted as illustrative and not in a limiting sense.

What is claimed is:

1. Pellet heat exchange apparatus or the like including a closed upright housing having a pellet inlet port at its upper end and a pellet outlet port at its remotely spaced end arranged to permit the descent of pellets therethrough; a fluid inlet port in said housing adjacent the pellet outlet port and a fluid outlet port adjacent the pellet inlet port adapted to direct a fluid through the housing in opposition to the descending pellets; a plurality of restraining members extending across the housing, each including a broad edge facing upward and a relatively narrow edge facing downward to present a maximum resistance to the descending pellets and a minimum resistance to the ascending fluid.

2. Pellet heat exchange apparatus or the like including a closed upright housing having a pellet inlet port at its upper end and a pellet outlet port at its remotely spaced end arranged to permit the descent of pellets therethrough; a fluid inlet port in said housing adjacent the pellet outlet and a fluid outlet port adjacent the pellet inlet adapted to direct an ascending fluid through the housing in opposition to the descending pellets; and restraining means disposed across the housing having a broad edge thereof directed toward the descending pellets and a narrow edge directed toward the ascending fluid to thereby significantly retard the fall of pellets while offering minimum resistance to the ascending fluid.

3. Pellet heat exchanger apparatus or the like including a closed upright housing having a pellet inlet port at its upper end and a pellet outlet port at its remotely spaced end adapted to permit the descent of pellets therethrough; a fluid inlet port in said housing adjacent the pellet outlet port and a fluid outlet port adjacent the pellet inlet port adapted to direct an ascending fluid through the housing in opposition to the descending pellets; streamline restraining tubes disposed across the housing with a broad edge thereof directed toward the descending pellets and a relatively narrow edge directed toward the ascending fluid to thereby retard the descending pellets while offering minimum resistance to the ascending fluid; and header means at opposite sides of the housing adapted to provide intermediate fluid chambers receiving a cooling fluid circulating through the restraining tubes.

References Cited in the file of this patent

UNITED STATES PATENTS

| | | |
|---|---|---|
| 1,789,880 | Price | Jan. 20, 1931 |
| 1,958,364 | Govers | May 8, 1934 |
| 2,379,195 | Simpson et al. | June 26, 1945 |